United States Patent [19]

Jasko et al.

[11] 4,234,618

[45] Nov. 18, 1980

[54] LIPOIDAL COMPOSITIONS, HARD BUTTER COMPONENTS, AND IMPROVEMENT IN PROCESS FOR MAKING THE LATTER

[75] Inventors: James J. Jasko; Richard J. Zielinski, both of Middleburg Heights, Ohio

[73] Assignee: SCM Corporation, New York, N.Y.

[21] Appl. No.: 912,639

[22] Filed: Jun. 5, 1978

[51] Int. Cl.³ .................. A23D 5/00; C11C 3/12; A23G 1/00
[52] U.S. Cl. ............................... 426/607; 426/613; 426/660; 260/409
[58] Field of Search .............. 260/409, 428.5, 40; 426/607, 609, 613, 660

[56] References Cited

U.S. PATENT DOCUMENTS

| | | | |
|---|---|---|---|
| 2,972,541 | 2/1961 | Cochran et al. | 260/409 |
| 3,856,831 | 12/1974 | Tateishi et al. | 260/409 |
| 4,108,879 | 8/1978 | Minowa et al. | 260/409 X |

FOREIGN PATENT DOCUMENTS

| | | |
|---|---|---|
| 556778 | 5/1957 | Belgium . |
| 1070908 | 12/1959 | Fed. Rep. of Germany . |
| 827172 | 2/1960 | United Kingdom . |

Primary Examiner—Robert A. Yoncoskie
Attorney, Agent, or Firm—Richard H. Thomas

[57] ABSTRACT

An inventive composition has a fat fraction comprising about 15–40 parts cocoa butter, about 0–25 parts butterfat, with the sum of the parts of cocoa butter and butterfat being not substantially in excess of about 40, and about 60–85 parts of a confectioner's hard butter. Such hard butter is essentially all 16–18 carbon atom triglycerides, is chemically quite dissimilar from cocoa butter, and has an SFI profile and melting characteristic somewhat higher than cocoa butter. Surprisingly, such hard butter is a fine replacement fat for cocoa butter, particularly when the composition contains some butterfat. The present invention is also directed to finished confectionery food compositions employing the subject inventive composition.

7 Claims, No Drawings

LIPOIDAL COMPOSITIONS, HARD BUTTER COMPONENTS, AND IMPROVEMENT IN PROCESS FOR MAKING THE LATTER

Reference is made to U.S. Pat. No. 2,972,541 and U.S. patent application Ser. No. 815,158, filed July 13, 1977, now U.S. Pat. No. 4,134,905 the teachings of which are incorporated herein by reference.

BACKGROUND OF THE INVENTION

This patent application relates to a lipoidal composition, and more particularly to one comprising cocoa butter or cocoa butter plus butterfat and a special hard butter, to said special hard butter, and to an improvement in process for making same.

Recent price increases in chocolate liquor and cocoa butter have made it very desirable to find replacements for cocoa butter, particularly such replacements which can be blended with cocoa butter or cocoa butter plus butterfat to an at least appreciable extent, thereby providing certain economy for the final composition.

The search for such blendable replacements has taken two basic directions. One is to find fat that naturally approximates or can be transformed to approximate the chemical structure of the main triglycerides in cocoa butter. Such approach often requires the use of "exotic" fat starting materials such as illipe oil, mango oil, shea butter, sal fat, and the like. Clearly, the lauric oils, ie., those rich in lauric acid triglycerides, such as palm kernel oil, coconut, ouricury, muru-muru, and tucum are not logical candidates.

The other approach is to work with fats and oils and blends of same preponderating in triglycerides of $C_{16-18}$ fat-forming acids, for example, soybean oil, cottonseed oil, corn oil, palm oil, lard, safflower oil, sunflower oil, rice bran oil, olive oil, low erucic acid rapeseed oil, or the like, and to isolate a product that approximates the hardness, snap, and gloss characteristics of cocoa butter. Usually the search for such blendable replacement in this case involves the isolation of a fat fraction derived from such oil or blend, which fraction is chemically quite unlike cocoa butter (for example, one that contains a reasonably high proportion of the unsaturated fat-forming fatty acids in a trans (high melting) as distinguished from a cis (lower melting) configuration. Cocoa butter contains no or virtually no such trans acids.

The closest art known to the inventors is the Cochran et al, U.S. Pat. No. 2,972,541 of Feb. 21, 1961. This patent shows a nonrandom triglyceride hard butter that is made from non-lauric oil and has certain defined proportions of saturated (fatty) acids and unsaturated fat-forming acids, a large proportion of which must be in the trans configuration. Such product is made by selectively hydrogenating the starting fat to eliminate at least most of the polyethenoic unsaturation and to get the designated proportion of monoethenoic unsaturation in the proper high trans to cis ratio. Following hydrogenation, the fat then is dissolved in solvent such as acetone or other ketone or 2-nitropropane, then subjected to successive fractional crystallization to isolate a high melting crystalline fraction such as a so-called "stearine" fraction and a crystalline hard butter fraction of the type the patent calls for.

Various fats can be used for the Cochran et al work and the instant invention. Among these are the oils soybean, cottonseed, safflower, palm, peanut, sunflower, low erucic rapeseed, corn, rice bran, sesame seed, citrus seed, the normally liquid fraction of lard or tallow, chicken fat, or mixtures of these. It generally is advantageous to start with oil from a single source for efficiency and economy. The preferred base stock for the instant invention is a hard butter made by the systematic, successive fractional crystallization of selectively hydrogenated high trans cottonseed oil from organic solvent. Additionally it is possible to use for the instant invention a mixture of oils that have been randomized by rearrangement, say, with sodium methylate, e.g., corn, soy, or safflower oil with palm oil, then subjected to such fractional crystallization.

One skilled in the art of fats very easily can picture the enormous number of triglyceride structures in even a selectively hydrogenated single oil such as cottonseed oil or soybean oil. The $C_{16-18}$ saturated fatty acids, plus the mono- and the few diunsaturated fat-forming acids in their several cis and trans forms can be attached in a large multiplicity of positions onto the glycerin molecules to make the various triglycerides present. If such fat is not randomized, certain naturally-occurring glyceride configurations can preponderate peculiarly over others. In any event, because of configuration and concentration, there can exist in such fat totally unpredictable and unknown combinations of triglycerides for low melting, eutectic, or near eutectic compositions, some of which might have the desirable hardness at 70°, 80° and 92° F. and might melt at about human mouth temperature to give a desirable hard butter characteristic. The isolation, from such mysterious conglomeration of esters of a fat having not only good hard butter characteristics, but also one which is excellent as a replacement fat for cocoa butter (particularly in compositions containing some butterfat mixed with chocolate) is empirical and adventitious. (Chocolate liquor by itself or mixed with butterfat, say, for making milk chocolate, is an especially difficult lipid substance to admix satisfactorily with any fat except more cocoa butter and still retain the desirable hardness, snap, and initial and retained gloss characteristics.) A fat to replace this "more cocoa butter" is termed a "replacement" fat in this application. The instant invention represents a fortuitous and adventitious discovery of just such replacement fat.

Hard butters are widely used in confectionary and various other edible products because they have good "stand up" characteristics at 50°–70° F., a very rapid melting beyond that point, and substantially total disappearance of any solid fraction at about human body temperature. In actual practice hard butter usually has a melting point (usually measured as a Wiley Melting Point, abbreviated "WMP") between about 90° F. and 105° F. or even higher (the high melting ones—above 103° F.—generally being regarded as quite inferior substitutes for cocoa butter). The odor is nil and taste of hard butter ordinarily is bland. Such fat should be brittle at temperature up to about 75° F., this brittleness sometimes referred to as "snap". It should stand up to such temperatures without "sweating" or "bleeding" out to the surface of droplets or any visible liquid film.

When such hard butter is mixed with cocoa and sugar etc. in coatings and aged, the resulting product should resist dulling and loss of gloss, "graying", and "blooming" (which makes the coated food look unappetizing). Such changes in surface appearance often accelerate by alternately heating and cooling the coated product a number of times (commonly termed "cycling").

BROAD STATEMENT OF THE INVENTION

In one aspect of this invention is a composition comprising: about 15-40 parts cocoa butter; about 0-25 parts butterfat, the sum of the parts of said cocoa butter and of said butterfat being not substantially in excess of about 40; and about 60-85 parts of confectioner's hard butter having the following characteristics: at least about 96% $C_{16-18}$ triglycerides, with not more than about 20% of its fat-forming acids being unsaturated and in the cis configuration; SFI profile of 78-85% at 50° F. and at 70° F., 70-80% at 80° F., 31-45% at 92° F., 3% maximum at 100° F., and zero at 110° F.; and a Mettler Dropping Point ("MDP") between about 36° and about 39° C.

Another aspect of this invention is such hard butter itself. It is rather high melting compared to cocoa butter; thus, it is surprising then, when it is blended as above with at least cocoa butter and, particularly with cocoa butter and butterfat, that such an excellent product results.

A still further aspect of this invention is an improvement in process for the systematic, successive fractional crystallization of fat, said fat being a mixture of saturated and unsaturated triglycerides, from a fugitive solvent for said fat, said fat containing about 35-60% unsaturated triglycerides whose fat-forming acids exhibit a trans configuration, being substantially devoid of polyunsaturated triglycerides (that is, not more than about 5% by weight), and containing about 35-45% saturated triglycerides, into at least one saturated triglyceride-rich solid fraction and a solid fraction less rich in saturated triglycerides, but rich in triglycerides whose fat-forming acids are in a trans configuration and which fraction exhibits characteristics of a hard butter. The improvement comprises subjecting said solid fraction less rich in saturated triglycerides to (a) dissolution in fugitive solvent, thereby making a new solution, (b) fractionally crystallizing between about 75% and about 95% of the resulting solute fat as crystal from said new solution, (c) recovering said fat crystal, and (d) stripping solvent from said recovered crystal.

DETAILED DESCRIPTION OF THE INVENTION

"SFI" (Solids Fat Index—also occasionally more elegantly called "SCI"—Solids Content Index) is a measure by dilatometry of the solid phase coexisting with the liquid phase of a fat at a given temperature, and it can be measured by the AOCS Official Method Cd 10-57.

An expert in fats will notice that the SFI profile and Mettler Dropping Point (which in this instance happens to be slightly below the Wiley Melting Point, but is a far more reproducible value) is not only slightly higher in mid-range and at ultimate complete melting than various commercial hard butters presently available, and particularly those rich in unsaturated fat-forming acids of a trans configuration, but also higher in the same way when compared to (a) either cocoa butter by itself, or (b) cocoa butter containing various customary levels of butterfat supplied by admixture of whole milk solids into cocoa butter. Wiley Melting Point determination is by AOCS Official Method Cc 2-38.

Curiously, the inventors have discovered that their hard butter, which is structurally different from cocoa butter instead of approximating it in chemical structure, must be somewhat harder in those respects in order to blend well with cocoa butter (and particularly with cocoa butter blended with butterfat)—otherwise the resulting blend is too soft and such hard butter only can be considered a less desirable replacement fat at best.

Thus, when a recipe using chocolate liquor is formulated to make an enrobing compound for candy or the like (chocolate liquor being approximately 48% cocoa fiber and 52% cocoa butter), and such chocolate liquor is admixed with the usual proportions of sucrose, lecithin, vanillin, and a customary proportion of butterfat from milk solids, one can utilize the instant hard butter as a complete replacement, pound for pound, for all the additional cocoa butter customarily used to blend into such mixture. Such replacement causes no particularly noticeable diminution in or impairment of the visual appearance, organoleptic quality, or eating quality of the resulting enrobing compound.

The teachings of U.S. Pat. No. 2,972,541 are incorporated herein expressly by reference. Selective hydrogenation conditions, normally using molecular hydrogen gas, are those which eliminate virtually all of the highly reactive polyethenoic unsaturation in a fat or mixture of fats (maximum polyunsaturated fat left being about 5%) and at the same time can provide a high proportion of elaidinization in the remaining unsaturated fatty acids to give a "high trans" product (e.g. 35-60% by weight of all the combined acids present). The term "elaidinization" is used here in the broad sense, meaning converting one or more olefinic double bonds of a fat-forming acid radical into a trans configuration as distinguished from the cis configuration.

Temperature for such hydrogenation broadly can start at about 250° F. and reach 460° F., advantageously starting at 270° F. and reaching 400°-425° F.

For such hydrogenation pressure used is at least about 5 and generally is between about 5 and about 80 psig. Advantageously it is between about 5 and about 60 psig. The time for such hydrogenation usually is at least about 2 hours and often is 4-7 hours or longer. Generally the hydrogenation is stopped when the Iodine Value of the fat is between about 50 and about 70, and advantageously when it is between about 50 and about 60.

The most effective catalysts known to applicants for such hydrogenation include previously used supported nickel hydrogenation catalysts, that had been employed for hydrogen reduction of fats, e.g. 2-4 such uses of catalyst in fat hydrogenation (such catalysts have been partially inactivated or somewhat poisoned because of such prior uses). These can be blended also with fresh supported nickel fat hydrogenation catalyst. Based on fat about 0.01-0.2% nickel can be used and about 0.07% is preferred. Other useful catalysts include sulfided nickel catalysts such as Unilever Ltd.'s Pricat ®9908. Even the dual catalyst scheme of John Hasman in his copending U.S. patent application Ser. No. 815,158, entitled "Trans-Acid Restricted Hard Butters", filed July 13, 1977, now U.S. Pat. No. 4,134,905, appears useful here. In the latter instance barium oxide-promoted copper chromite catalyst (e.g., Code 102 Calsicat, Division of Mallinckrodt, Inc.) is used in a first stage of hydrogenation and conventional supported nickel catalyst (e.g. Harshaw Nysel HK-4) in a second stage.

As discussed above the preferred base material for making the instant hard butter is an alkali refined and selectively hydrogenated cottonseed oil having I.V. of about 50–60 and possessing the following typical analysis:

| Temperature, °F. | SFI |
|---|---|
| 50° | 69.4 |
| 70° | 60.8 |
| 80° | 57.0 |
| 92° | 38.1 |
| 100° | 20.1 |
| 110° | 2.7 |
| WMP °F. | 111.0 |
| MDP °C. | 43.8 |

| Combined Acids | % |
|---|---|
| Lauric | 0.2 |
| Myristic | 1.0 |
| Palmitic | 23.8 |
| Palmitoleic | 0.6 |
| Stearic | 13.6 |
| Oleic | 57.0 |
| Linoleic | 4.0 |

(the unsaturated acids listed above being in both cis and trans forms or configurations)

| | |
|---|---|
| I.V. | 56.5 |
| Trans acids, % of total combined acids | 41.7 |
| Free Fatty Acids, % | 0.2 |

Such base material is dissolved in solvent, advantageously 2-nitropropane as shown in Examples 1, 2, and 3 below. Acetone is a good alternative solvent.

A fugitive solvent for the instant purpose is one that will dissolve fat to at least about 10 grams per 100 cc. at a temperature not substantially above 50° C., which solvent has less solubility for the fat and particularly for the saturated parts thereof as temperature of the solution is reduced, and can be stripped away from the fat essentially completely if not entirely at a temperature and within a time that will not cause significant fat degradation (e.g. 5 to 60 minutes at a temperature not exceeding about 500° F. using very low absolute pressure, e.g. 1 mm Hg or less, if necessary). Typical solvents having this property include aprotic solvents such as the nitropropanes and particularly 2-nitropropane, ketones such as acetone and 2-butanone, lower paraffins in the liquid phase such as hexane down to propane, acetamide, carbon tetrachloride, chloroform, hexamethylphosphoramide, benzene, dimethylformamide, tetrahydrofuran, and dimethyl sulfone.

As shown in U.S. Pat. No. 2,972,541 fractional crystallization of the dissolved fat then is commenced systematically by gradually reducing the temperature of the solution until a crop of higher melting crystals are obtained. A scraped-wall chiller customarily is used for crystallizing, and a refrigerant such as direct expansion ammonia can be used for indirectly cooling the solution and resulting slurry. Six to ten parts of solvent can be used per part of fat solute with good effect. When the temperature reaches that where a first fraction rich in saturated triglycerides can be cropped, typically 59°±2° F., the resulting slurry is filtered and the filter cake washed with solvent colder than such cake. Following U.S. Pat. No. 2,972,541 a second crystal crop is taken from the mother liquor (which usually has been diluted with washings of the first cake) by slowly cooling typically to 27°±2° F. at average rate of about 1° F. per minute. This often is termed a "B" or hard butter fraction, and it is an excellent starting material for making the instant inventive special hard butter. When various other fats or fat mixtures or rearranged fats are used, the foregoing parameters most likely will have to be varied somewhat to yield the appropriate feed fraction for the instant purpose. Similarly, various other fats will need more or less hydrogen added. There is the rare possibility of having a fat mixture or rearranged fat with substantially the correct proportion of unsaturated to saturated combined fatty and other fat-forming acids—so that hydrogenation can be replaced by elaidinization treatment; in such instance little or no hydrogen need be chemically united with the fat, or, if a selective hydrogenation catalyst is used, the atmosphere could be very low in and/or free of molecular hydrogen without departing from the precepts of this invention.

Apparatus necessary for performing the Mettler Dropping Point determination includes the Mettler Instrument Corporation electronic control FP5 modified to heat at a slower rate and Mettler furnace FP53 with accessories, and Wiley Melting Point plates. Accessories are at least one sample cup, which fits into a cartridge, which assembly in turn fits into a sleeve. The sample cups have a bottom opening of 2.8 mm diam. They also fit into the holes of the Wiley plate.

One melts the fat sample and fills the cup dropwise with the sample after the cup has been precooled and still remains in the Wiley plate holes, said plate being in a tray of dry ice (solid carbon dioxide). It is not necessary to level off the top of the cup. The sample then is chilled for at least ten minutes.

A starting temperature 5° C. below the excected melting point is set on the furnace control, along with a programmed heating rate of 1° C. per minute. When furnace temperature agrees with the indicator on the control unit, the chilled dropping point cup is removed from the dry ice tray by using the upper portion of the cartridge and assembled with such cartridge, then the drop-collecting sleeve is attached. This assembly is inserted vertically into the furnace and rotated until the cartridge locks in position. At this stage the cup is equilibrated with the lowest temperature of the furnace by waiting two minutes, then the automatic heating rate is activated. The Dropping Point will be recorded by the apparatus, usually in °C. The Dropping Point very closely approximates the Wiley Melting Point, and it is more reproducible; it eliminates an operator's subjectivity which is inherent in measurement of Wiley Melting Point.

Various confectioner's formulae are shown in the exemplary material which follows. Such material shows ways in which the instant invention has been or can be practiced, but should not be construed as limiting the invention. In this specification all parts are parts by weight, all percentages are weight percentages and all temperatures are in degrees Fahrenheit unless otherwise expressly indicated. The term "fatty acids" as used herein means saturated fat-forming acids, mainly $C_{12-26}$. The term "other fat-forming acids" is used to embrace the unsaturated fat-forming acids, mainly of the same chain length.

EXAMPLES 1, 2 and 3

The starting material was a so-called "B" fraction cropped by systematic fractional crystallization of high trans selectively hydrogenated cottonseed oil, typical analysis of which oil and production of which B fraction has been outlined above.

The specific B fraction starting material for these Examples had the following analysis:

| Combined Acids | % |
|---|---|
| Lauric | 0.2 |
| Myristic | 1.0 |
| Palmitic | 22.8 |
| Palmitoleic | 0.6 |
| Heptadecanoic | 0.1 |
| Isostearic | 0.1 |
| Stearic | 11.7 |
| Oleic | 60.0 |
| Linoleic | 3.4 |
| Eicasanoic | 0.1 |

(the unsaturated acids listed above being in both cis and trans configurations)

| | |
|---|---|
| Trans acids, % of total combined acids | 46.9 |
| I.V. | 58.1 |
| WMP, °F. | 96.4 |

In each of these Examples one part of this B fraction hard butter starting material was used. Such feed was dissolved in the indicated parts of 2-nitropropane at 120° F. In each exemplary preparation this solution then was cooled at an average rate of about 1° F. per minute to the final slurry temperature indicated. The refrigerant used was aqueous ethylene glycol on the jacket side of a scraped-wall heat exchanger. Each slurry was filtered by vacuum filter. The resulting prime cake in each instance was repulped with 175 parts of about 24° F. 2-nitropropane, then refiltered under vacuum. Each resulting washed cake was stripped of 2-nitropropane and steam deodorized at 240° C. and below 1 mm Hg absolute pressure for 60 minutes to yield the inventive hard butter. Such product had between 14 & 15% of its combined acids in the cis configuration versus about 17% for the starting hard butter.

| Example No. | Parts of 2-NP used for initial soln. | Final Slurry temperature, °F. | Yield, % based on starting material |
|---|---|---|---|
| 1 | 6 | 33 | 83.4 |
| 2 | 8 | 31 | 81.9 |
| 3 | 10 | 26 | 85.3 |

The separation was a bit sharper in Example 3 with the greater volume of solvent than it was in the two other Examples, but all products were quite satisfactory. The characteristics of each product are tabulated below:

Product of Example 1

| Temperature, °F. | SFI | |
|---|---|---|
| 50 | 80.9 | |
| 70 | 81.1 | |
| 80 | 77.6 | |
| 92 | 38.4 | |
| 100 | 2.3 | |
| 110 | 0.0 | |
| MDP, °C. | 37.7 | (Mettler Dropping Point) |
| Iodine Value | 55.3 | |
| Trans acids, % of total combined acids | 47.1 | |

Product of Example 2

| Temperature, °F. | SFI |
|---|---|
| 50 | 79.1 |
| 70 | 79.8 |
| 80 | 77.3 |
| 92 | 41.1 |
| 100 | 1.7 |
| 110 | 0.0 |
| MDP, °C. | 38.0 |
| Iodine Value | 54.2 |
| Trans acids, % of total combined acids | 46.6 |

Product of Example 3

| Temperature, °F. | SFI |
|---|---|
| 50 | 79.1 |
| 70 | 79.5 |
| 80 | 76.7 |
| 92 | 39.3 |
| 100 | 0.7 |
| 110 | 0.0 |
| MDP, °C. | 37.8 |
| Iodine Value | 55.0 |
| Trans acids, % of total combined acids | 46.1 |

The novel hard butter of Example 3 was compounded into several representative confectionary coatings using chocolate liquor, whole milk powder, such inventive hard butter, sucrose, 0.05% vanilla-like flavor, 0.1% salt, and 1.2% lecithin. Such coatings had the following tabulated lipid composition as a fraction of the total fat present. The three fats (cocoa butter from the chocolate liquor, butterfat from the milk powder, and the Example 3 hard butter) plus 1.2% lecithin as a percentage of these three fats, constituted all the lipid composition of the coatings, which, advantageously is about 32% of the coating and broadly is about 30–35%.

| Fat, % | Low Butterfat Milk Chocolate | High Butterfat Milk Chocolate | Semi-Sweet Chocolate |
|---|---|---|---|
| cocoa butter | 27 | 15 | 35 |
| butterfat | 8 | 20 | 0 |
| inventive hard butter from Example 3 | 65 | 65 | 65 |
| Total | 100 | 100 | 100 |

The hard butter so used represented replacement of all of the cocoa butter normally added in analogous chocolate formulations over and above the cocoa butter from the chocolate liquor. All samples exhibited organoleptic, hardness, snap, and gloss characteristics very much like such analogous formulations (where no hard butter is used, but only added cocoa butter in its place). The products also had better hardness, better snap, better gloss characteristics, and better organoleptic properties than like compositions would have had, had all the hard butter used been the starting material, or another popular hard butter, the specifications of which are given below.

Analytical data and SFI profile of the starting B or hard butter fraction have been given above. Typical constants for the starting so-called "B" fraction include the following:

| SFI Profile | | |
|---|---|---|
| Temperature, °F. | °C. | % Solids |
| 50 | 10 | 75–79 |
| 70 | 21.1 | 69–74 |
| 80 | 26.7 | 63–66 |
| 92 | 33.3 | 25–30 |
| 100 | 37.8 | 1.0 Max. |
| WMP, °F. (Modified by tempering for 15 minutes only instead of 2 hours) | | 95–98 |
| I.V. | | 54–58 |
| Flavor | | Bland |

Fractional crystallizations similar to those of Examples 1, 2 and 3, but on a plant scale, were run using a 10:1 solvent: starting fat ratio, but cooling the resulting slurry to 20° F. for its filtration; the filter cake was washed without repulping; also the steam deodorization was done at 475° F. and 5 mm Hg absolute pressure for 20 minutes. From such experience and other various laboratory work the following specifications were developed for the instant inventive hard butter:

| | SFI Profile | |
|---|---|---|
| Temperature °F. | Broad Range, Solids | Exemplary Solids |
| 50 | 78–85 | 79 |
| 70 | 78–85 | 79 |
| 80 | 70–80 | 76 |
| 92 | 31–45 | 38 |
| 100 | 0–3 | 1 |
| 110 | 0 | 0 |
| | Broad | exemplary |
| Trans acids, % of total combined acids | 40–50 | 45 |
| Mettler Dropping Point | 36°–39° C. | |
| Flavor Bland | | |

The following formulas represent basic ones for chocolate-flavored coatings, and these can, of course, be modified to suit various individual tastes and product needs. The hard butter used in each case is like that of Example 3.

| Dark Sweet Coating | |
|---|---|
| Ingredients | % |
| Chocolate Liquor | 18 |
| Special Hard Butter | 20 |
| Cocoa Powder (containing 11% cocoa butter) | 10 |
| Sucrose | 51.45 |
| Salt | 0.10 |
| Methyl Vanillin (a flavorant) | 0.05 |
| Lecithin | 0.40 |
| Total coating | 100.00 |

| | Percent | |
|---|---|---|
| Approximate Fat Levels | Fat Basis | Coating Basis |
| Cocoa Butter | 33.90 | 10.46 |
| Special Hard Butter | 64.81 | 20.00 |
| Lecithin (considered as a fat here) | 1.29 | 0.40 |
| Total fat | 100.00 | 30.86 |
| Hard Butter: Cocoa Butter Ratio | | 72:28 |
| Total Cocoa Solids 19% | | |

| Milk Type Coating | |
|---|---|
| Chocolate Liquor | 16.00% |
| Special Hard Butter | 20% |
| Whole Milk Powder | 10% |
| Non-fat Dry Milk | 3% |
| Sucrose | 50.45% |
| Salt | 0.10% |
| Methyl Vanillin | 0.05% |
| Lecithin | 0.40% |
| Total coating | 100% |

| | Percent | |
|---|---|---|
| Approximate Fat Levels | Fat Basis | Coating Basis |
| Cocoa Butter | 26.55 | 8.32 |
| Butterfat | 8.36 | 2.62 |
| Special Hard Butter | 63.81 | 20.00 |
| Lecithin | 1.26 | 0.40 |
| Total fat | 100.00 | 31.34 |

| Light Milk Coating | |
|---|---|
| Chocolate Liquor | 11% |
| Special Hard Butter | 20% |
| Whole Milk Powder | 21% |
| Non-fat Dry Milk | 6% |
| Sucrose | 41.45% |
| Salt | 0.10% |
| Methyl Vanillin | 0.05% |
| Lecithin | 0.40% |
| Total coating | 100% |

| | Percent | |
|---|---|---|
| Approximate Fat Levels | Fat Basis | Coating Basis |
| Cocoa Butter | 18.08 | 5.72 |
| Butterfat | 17.42 | 5.51 |
| Special Hard Butter | 63.24 | 20.00 |
| Lecithin | 1.26 | 0.40 |
| Total fat | 100.00 | 31.63 |

The following is suggested when using the special hard butter in confectionary coatings:

Processing

Coatings made with the special hard butter here offer processing and handling advantages over chocolate. Tempering is either eliminated or greatly simplified. When used as a tempered hard butter, equipment and procedures are similar to those for chocolate coatings. Optimum temper (about 2% seed crystals*) is influenced by coating formulation and the ratio of cocoa butter and butterfat in the total fat system. Optimum tempering temperature will typically range from 94° F.–97° F.

*cocoa butter stabilized in its most stable crystal form (substantially all in the beta triple chain length polymorph).

When used as a non-tempered hard butter, processing is simplified. Coating is cooled to 100°–105° F., and used.

Functional characteristics of the special hard butter coatings are determined by processing conditions and the levels of cocoa butter and butterfat in the coating formula. For best results, the following guidelines are recommended:

1. Total amounts of cocoa butter and butterfat derived respectively from chocolate liquor and whole milk powder should be between 30% and 40% of the total fat in the coating.
2. In formulas containing more than 35% cocoa butter and butterfat, at least 10%, to a maximum of 20% of the total fat should be butterfat.
3. In certain applications, the best organoleptic characteristics are achieved through tempering.

Representative cocoa butter typically has the following SFI profile:

| Temperature, °F. | % Solids |
| --- | --- |
| 50 | 80–84 |
| 70 | 75–80 |
| 80 | 64–66 |
| 92 | 6–10 |
| 100 | 0 |
| 110 | 0 | and typically has the following fat-forming acid analysis:

| | |
| --- | --- |
| myristic | 0.1 |
| palmitic | 25.8 |
| palmitoleic | 0.3 |
| heptadecanoic | 0.1 |
| stearic | 34.2 |
| oleic | 35.2 |
| linoleic | 2.9 |
| linolenic | 0.6 |
| $C_{20}$ | 0.8 | with nothing in a trans configuration; and its Wiley Melting Point measured officially is 84°–86° F. When measured after the incorporation of a tempering procedure like that customarily used for chocolate coatings, the WMP reaches 89°–93° F. The Mettler Dropping Point is 33°–35° C. (93°–95° F.). While these figures indicate the unique nature of cocoa butter, they also should be contrasted with the data for the inventive special hard butter (which show a much higher value at 92° F. and for the MDP). Additionally the inventive special hard butter previously exemplified had only between 14 and 15% of its fat-forming acids in the cis configuration (in effect not substantially above about 15% and in no event would such value be above about 20%) whereas typical cocoa butter has about 38%, and even the very lower limit for such acids in the Cochran et al U.S. Pat. No. 2,972,541 is 15% with that value extending to an upper limit of 40%.

What is claimed is:

1. A composition comprising:
    about 15–40 parts cocoa butter;
    about 0–25 parts butterfat,
        the sum of the parts of said cocoa butter and of said butterfat being not in excess of about 40; and
    about 60–85 parts of confectioner's hard butter having the following characteristics;
        at least about 96% $C_{16-18}$ triglycerides with about 40–50% by weight of the total combined acids being unsaturated acids in the trans configuration, a substantial proportion of the remaining acids being also unsaturated and in the cis configuration,
        an SFI profile of 78–85% at 50° F. and at 70° F., 70–80% at 80° F., 31–45% at 92° F., a maximum of 3% at 100° F., and zero at 110° F.; and
        a Mettler Dropping Point between about 36° and about 39° C.

2. The composition of claim 1 which is a food composition wherein there are about 5–20 parts of butterfat furnished by the incorporation of whole milk solids.

3. The composition of claim 1 which is a food composition wherein the said cocoa butter, said butterfat, said confectioner's hard butter, and about 1–2 parts of lecithin is about 30–35% of the composition, and the remainder comprises functional amounts of sucrose, cocoa fiber, flavorant, and sodium chloride.

4. The composition of claim 3 wherein the sucrose constitutes about 40–55%, and at least part of said cocoa fiber and said cocoa butter are furnished by the inclusion of chocolate liquor in said composition.

5. The composition of claim 2 wherein cocoa fiber constitutes about 5–20% of the composition.

6. Confectioner's hard butter comprises:
    at least about 96% $C_{16-18}$ triglycerides with about 40–50% by weight of the total combined acids being unsaturated acids in the trans configuration, a substantial proportion of the remaining acids being also unsaturated and in the cis configuration; said hard butter having
    an SFI profile of 78–85% at 50° F. and at 70° F., 70–80% at 80° F., 31–45% at 92° F., 3% maximum at 100° F., and zero at 110° F.; and
    a Mettler Dropping Point between about 36° and about 39° C.

7. The hard butter of claim 6 derived by fractionation from hydrogenated cottonseed oil whose triglycerides have about 35 to 60% of their fat-forming acids in a trans configuration.

* * * * *